United States Patent

[11] 3,580,658

| [72] | Inventor | Percy L. Swanson |
| | | 2244 N.W. Overton, Portland, Oreg. 97210 |
| [21] | Appl. No. | 739,415 |
| [22] | Filed | June 24, 1968 |
| [45] | Patented | May 25, 1971 |

[54] GAS COOLED MICROSCOPE SLIDE
8 Claims, 4 Drawing Figs.

[52] U.S. Cl. .................................................. 350/93, 356/244
[51] Int. Cl. .................................................. G02b 21/34
[50] Field of Search .......................................... 350/92—95, 1, 3; 356/244, 246; 161/165, 192—204

[56] References Cited
UNITED STATES PATENTS
3,192,575  7/1965  Rosenau et al. .............  350/3X
FOREIGN PATENTS
174,396  7/1964  U.S.S.R. ......................  350/93

OTHER REFERENCES
Scaife, P. E., " A Cell For The Measurement Of Reflectance Of Powders At Low Temperatures", Notes On Experimental Technique And Apparatus. J. Sci. Instru. Vol. 43, July 1966. 3,561,244. PP. 484— 485

*Primary Examiner*—David Schonberg
*Assistant Examiner*—T. H. Kusmer
*Attorney*—Buckhorn, Blore, Klarquist and Sparkman ABSTRACT: A gas cooled microscope slide having a built-in cooling chamber formed by a through opening in the slide body which is closed top and bottom by spaced laminated glass windows upon which a specimen is placed for observation. Internal passages in the slide body direct a gas coolant to and from the chamber and lead to edge openings in the slide body which are connected by flexible tubing to a coolant source and to cooling and drying elements.

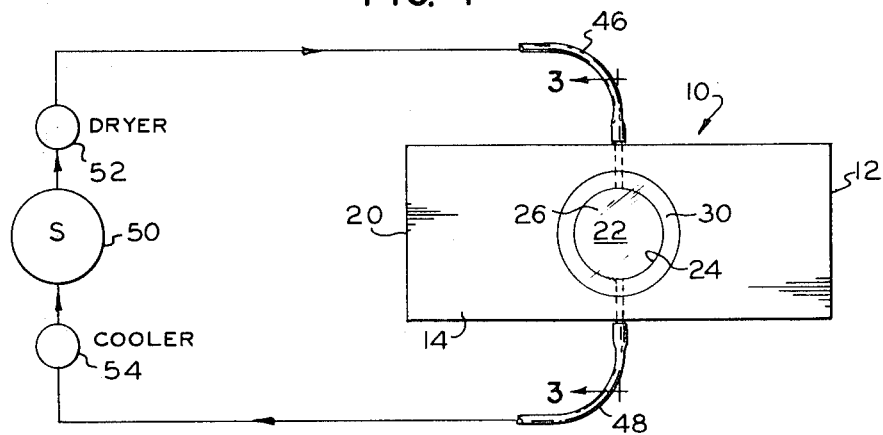
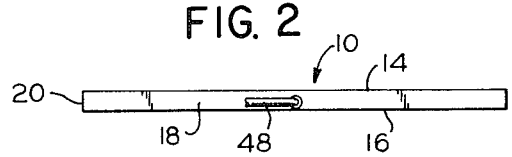
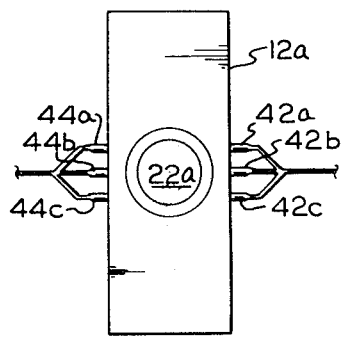
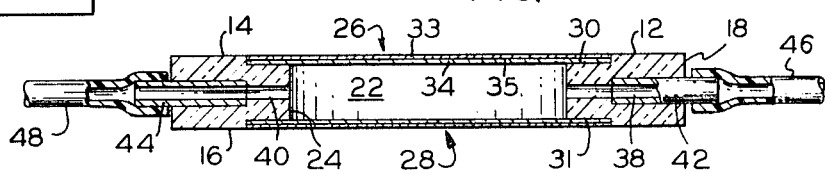
PERCY L. SWANSON
*INVENTOR*
BY
BUCKHORN, BLORE, KLARQUIST & SPARKMAN
*ATTORNEYS*

GAS COOLED MICROSCOPE SLIDE

BACKGROUND OF THE INVENTION

1. Field of the Invention

The present invention relates to microscope slides and more particularly to a microscope slide with means for cooling the observation window of the slide while the slide is in use to prolong the life of a living specimen under observation on the slide.

2. Description of the Prior Art

Heretofore it has been difficult if not impossible to observe living tissue and microorganisms for any substantial length of time under high powered optical microscopes because the high temperature resulting from the intense light necessary for high magnification quickly kills living specimens and evaporates their liquid culture. Under such conditions live specimens live only a very brief and unhealthy period, making conclusions from observation difficult and of doubtful accuracy. The researcher is also required to spend long and frustrating period of time observing many different specimens during their short life span under the microscope to reach any conclusion at all.

Prior attempts have been made to solve the foregoing problem, by incorporating in the microscope itself a cooling jacket filled with a liquid coolant in surrounding relation to the slide. However, such liquid cooling systems are unsuitable for work requiring high magnification because light refraction through the liquid and air bubbles in the liquid become a problem. Liquid coolants cannot be interposed between the objective lens of the microscope and the slide specimen or between the specimen and the light source at high levels of magnification without causing unacceptable distortion of the image. Such cooling systems also greatly increase the complexity and expense of the microscope.

As a result of the foregoing problems in the observation of live specimens under high magnification in optical microscopes and the lack heretofore of a satisfactory solution thereto, the study of live specimens under high magnification has been curtailed, expensive, time consuming and of somewhat doubtful value. Thus progress in basic research in this area has been slow.

SUMMARY OF THE INVENTION

The problems in observing live specimens under high magnification are overcome by the present invention through the provision of a microscope slide having a built-in cooling chamber beneath the glass membrane of the slide on which the live specimen is placed for observation. A gas coolant is passed continuously through the chamber while the slide is in the microscope to cool the glass membrance and thereby prolong the life of the specimen while under observation. The slide with built-in cooling chamber may take the outline form and size of a conventional thin microscope slide. The cooling chamber is defined by spaced-apart upper and lower glass or other transparent plates or windows closing a cavity within the slide body. Each window is composed of at least two laminates of extremely thin glass bound together by a transparent adhesive having the same refractive index as the glass for strength and for maintaining the glass in an optically flat condition to prevent distortion.

Primary objects of the invention are to provide:

1. a cooling system for microscopes which prolongs the lives of living specimens while under high magnification, thereby enabling a researcher to observe the live, healthy actions of a single specimen over a substantial time period;

2. a cooling system as aforesaid which will save research time, which will reduce the number of specimens required to record observations and reach conclusions, and which will lead to more accurate research conclusions;

3. a microscope slide having a built-in cooling chamber;

4. a microscope slide which is cooled internally by a circulating gas coolant;

5. a microscope slide having an internal cooling chamber defined by a pair of vertically spaced, thin, transparent windows;

6. a microscope slide as aforesaid in which each window is composed of a series of thin, laminated glass membranes so as to maintain the window in an optically flat condition; and 7. a cooling system for optical microscope slides including a gas coolant circuit comprising a gas cooling chamber within a microscope slide, a source of gas coolant, a gas cooling means, a gas drying means and conduit means, including internal passages in the slide, interconnecting the chamber, source, cooling means and drying means.

BRIEF DESCRIPTION OF THE DRAWINGS

The foregoing and other objects and advantages of the present invention will become more apparent from the following detailed description which proceeds with reference to the accompanying drawing wherein:

FIG. 1 is a partially schematic plan view of a cooling system including a gas-cooled microscope slide in accordance with the invention;

FIG. 2 is a side elevational view of the slide of FIG. !;

FIG. 3 is a vertical sectional view on an enlarged scale taken along the line 3–3 of FIG. 1; and FIG. 4 is a plan view of a modified form of microscope slide in accordance with the invention.

DETAILED DESCRIPTION

With reference to the drawing, FIG. 1 discloses a microscope slide 10 including a generally rectangular, thin, platelike slide body 12 having a length, width and thickness which may correspond to those of a conventional microscope slide. The slide body includes a top surface 14, bottom surface 16 and side and end edge surfaces 18 and 20. The slide body may be made of any suitable material such as, for example, a plastic such as Teflon or polybutyl, or a metal such as aluminum.

The slide incorporates a central internal cooling chamber 22, shown best in FIG. 3, formed by a bore 24 extending through the slide body from its upper to its lower surface, and a pair of spaced transparent plates or windows 26, 28 closing the top and bottom of the opening, respectively. Each window is circular and has a larger diameter than central opening 24. Each window is cemented to an annular recessed ledge 30, 31 of the slide body 12. The recesses are sized to correspond to the thickness of the windows so that the outer faces of the windows are coplanar with the top and bottom surfaces 14, 16 of the slide body. The adhesive joining the windows to the slide body is preferably of a strength selected so that if a window is broken, it can be easily removed from the slide body and replaced.

It is important that the chamber have a sufficient volume to prevent a buildup of any substantial internal gas pressure that would break or distort the windows. The windows must therefore be thin to provide the necessary volume and yet must have sufficient strength to resist breakage and distortion. Furthermore, it is important for distortion-free observation under high magnifications that the slide windows be optically flat. To satisfy the above requirements, each window is of laminated construction including at least two thin disc-shaped laminates or membranes of glass 33, 34 joined together by an adhesive 35 having the same index of refraction as the glass membranes. A suitable adhesive for this purpose is a chemical resin sold under the brand name Permount, manufactured by the Fisher Company. Another suitable adhesive is Balsam, an organic resin. It has been found that the laminated construction of the windows prevents any objectionable sag or other distortion of the glass under high magnifications of the order of 450 to 1,500 power and provides the windows with sufficient strength to resist breakage from internal gas pressure or under normal usage. The total thickness of each window may be, for example, between 0.3 and 0.4 millimeters. It may be necessary in some instances for the windows to be even thinner, for example under extremely high magnifications where the overall thickness of the slide must be kept to a minimum. In such instances, it may be necessary to make up windows of size 0 glass membranes having a thickness of 0.09 millimeters. In any event, it may be desirable or necessary in some instances to dimension the slides and their components to meet certain conditions, following the general mode of construction described. It is to be understood that the dimensions mentioned are illustrative only.

An internal intake passage 38 leads into the cooling chamber from one side edge 18 of the slide body, and a discharge passage 40 leads from the chamber to the opposite side edge of the slide body. The outer portion of each passage 38, 40 is enlarged and receives a metal tube coupling section 42, 44 which protrude from the opposite side edges of the slide body. The tube couplings receive the ends of elastic tubing 46, 48 forming part of the coolant circuit illustrated in FIG. 1.

The cooling circuit includes, in addition to the components already described, body source of cooling gas 50 under pressure such as an air pump, a dryer 52 for removing moisture from the gas, and a gas cooler 54 for reducing the temperature of gas returning from the cooling chamber 22. The coolant may comprise air or any other colorless, dense gas. The cooler may comprise one of the usual laboratory refrigeration systems well known in the art and the dryer may comprise one of the usual laboratory desicating systems.

FIG. 4 discloses a modified gas cooled slide including a slide body 12a and cooling chamber 22a as described with respect to FIGS. 1 through 3, but with three gas inlets 42a, 42b, 42c and the same number of gas outlets 44a, 44b, 44c, and with a corresponding number of interior intake nd discharge passages leading to and from the gas chamber. This modified passage arrangement increases the flow capacity of the system and thus its cooling efficiency without any appreciable buildup of gas pressure within the slide chamber.

In operation, the slide of the invention is used in exactly the same manner as an ordinary microscope slide. That is, the living specimen in an appropriate liquid culture is placed on the surface of top window 26 and then the slide is positioned in the usual location within the microscope between the objective lens system and the condenser lens system of the microscope. During the period of time that the slide is in the microscope, a colorless gas coolant such as air is circulated continuously to maintain the upper window of the microscope at a temperature sufficiently low to keep the living specimen alive and healthy for a prolonged period of time. This enables live tissues and microorganisms to be observed accurately in their normal live actions and developments over a considerably greater time period than would be possible with an ordinary microscope slide and under considerably higher magnifications than formerly possible. The use of the present slide is especially intended for microscopes having an oil immersion type of lens system capable of magnifications of the order of 450 to 1,000 times in conjunction with a high intensity lighting system of, for example, the Kohler type.

The dimensions and materials of the slide, the cooling chamber and their components may vary depending on requirements as already mentioned. For example, the maximum permissible thickness of the slide would be reduced as the magnification increases, so that windows of minimum thickness and a gas chamber of a minimum height would be used under extremely high magnifications of the order of 1,500 to 2,000 times, near the optical limits of an optical oil immersion microscope. The usual colored heat filters should continue to be employed in the condenser systems of microscopes using the gas-cooled slide.

Having illustrated and described what is presently a preferred embodiment of my invention, it should be apparent to those having skill in the art that the same permits of modification in arrangement, detail and dimensions. I claim as my invention all such modifications as come within the true spirit and scope of the following claims.

I claim:

1. An integral one-piece microscope slide comprising:
   a thin, flat, platelike slide body,
   cooling chamber means within said slide body,
   said cooling chamber means including a spaced-apart pair of plates of transparent material defining the upper and lower limits of said chamber and a light path through said body,
   and internal passage means in said slide body connected with said chamber for directing a gas coolant through said chamber from an external source,
   the maximum thickness of said slide body through said pair of transparent plates not exceeding the thickness of a conventional microscope slide not having a built-in cooling chamber, said thickness of a conventional microscope slide being less than 2 millimeters.

2. A slide according to claim 1 wherein said upper and lower plates are optically flat.

3. A slide according to claim 1 wherein said upper and lower plates are optically flat and have outer surfaces coplanar with the top and bottom surfaces, respectively, of said slide body.

4. A slide according to claim 1 wherein said passage means includes inlet and outlet openings at side edges of said slide body and coupling means for connecting said passage means to external conduit means.

5. A slide according to claim 1 including a gas cooling circuit comprising
   a source of pressurized gas,
   conduit means connecting said source to said passage means,
   and gas cooling and gas drying means in said circuit externally of said slide body.

6. A slide according to claim 1 wherein said passage means includes a plurality of internal passages connected in parallel with one another within said slide body and each communicating separately with said chamber.

7. A slide according to claim 1 wherein the maximum thickness of said slide as measured through said transparent plates and said cooling chamber is no greater than the thickness of said slide body and less than 2 millimeters.

8. An integral one-piece microscope slide comprising:
   a thin, flat, platelike slide body,
   cooling chamber means within said slide body,
   said cooling chamber means including a spaced-apart pair of plates of transparent material defining the upper and lower limits of said chamber and a light path through said body,
   internal passage means in said slide body connected with said chamber for directing a gas coolant through said chamber from an external source,
   each of said upper and lower plates comprising at least two laminates of transparent material having the same refractive index cemented together by transparent cementing means having the same refractive index as that of said laminates.